(12) United States Patent
Gaberthüel

(10) Patent No.: US 11,175,167 B2
(45) Date of Patent: Nov. 16, 2021

(54) THERMAL FLOWMETER

(71) Applicant: Endress+Hauser Flowtec AG, Reinach (CH)

(72) Inventor: Stephan Gaberthüel, Oberwil (CH)

(73) Assignee: Endress+Hauser Flowtec AG, Reinach (CH)

( * ) Notice: Subject to any disclaimer, the term of this patent is extended or adjusted under 35 U.S.C. 154(b) by 19 days.

(21) Appl. No.: 16/620,703

(22) PCT Filed: May 8, 2018

(86) PCT No.: PCT/EP2018/061862
§ 371 (c)(1),
(2) Date: Dec. 9, 2019

(87) PCT Pub. No.: WO2018/224233
PCT Pub. Date: Dec. 13, 2018

(65) Prior Publication Data
US 2020/0166394 A1 May 28, 2020

(30) Foreign Application Priority Data
Jun. 8, 2017 (DE) ...................... 10 2017 112 622.8

(51) Int. Cl.
*G01F 1/684* (2006.01)
*G01F 1/69* (2006.01)

(52) U.S. Cl.
CPC .................................. *G01F 1/6847* (2013.01)

(58) Field of Classification Search
CPC ........... G01F 1/6847; G01F 1/69; G01F 1/684
See application file for complete search history.

(56) References Cited

U.S. PATENT DOCUMENTS

| 5,892,149 A | 4/1999 | Theuer |
| 2001/0032503 A1* | 10/2001 | Schrittenlacher ....... G01F 1/699 |
| | | 73/204.11 |

FOREIGN PATENT DOCUMENTS

| CN | 201307027 Y | 9/2009 |
| CN | 101680788 A | 3/2010 |

(Continued)

OTHER PUBLICATIONS

English machine translation for WO 2017/067701.*

*Primary Examiner* — Peter J Macchiarolo
*Assistant Examiner* — Anthony W Megna Fuentes
(74) *Attorney, Agent, or Firm* — Christopher R. Powers; Endress+Hauser (USA) Holding Inc.

(57) ABSTRACT

The present disclosure relates to a thermal flowmeter comprising at least one measurement sensor having at least one sensor element for determining a measured value for determining the flow rate of a medium. A measurement transducer determines the flow rate using the determined measured value. A tubular connecting element connects the measurement sensor to the measurement transducer and a protective sleeve is provided, which is mechanically connected to the tubular connecting element. The protective sleeve has a sleeve casing having at least two openings, an inflow opening through which the medium can be delivered to the measurement sensor and an outflow opening through which the medium can flow out of the measurement sensor. The connection between the protective sleeve and the tubular connecting element is a connection which is positively engaged at least in part.

8 Claims, 3 Drawing Sheets

(56) References Cited

FOREIGN PATENT DOCUMENTS

| | | |
|---|---|---|
| DE | 3044419 A1 | 6/1982 |
| DE | 19719010 A1 | 11/1997 |
| DE | 19812027 A1 | 9/1999 |
| DE | 102007010912 A1 | 9/2008 |
| DE | 102008002871 A1 | 12/2009 |
| DE | 102015118125 A1 | 4/2017 |
| EP | 0943899 A1 | 9/1999 |
| WO | 2005064285 A2 | 7/2005 |
| WO | 2014075905 A1 | 5/2014 |
| WO | WO-2017067701 A1 * | 4/2017 ............... G01F 1/69 |

* cited by examiner

THERMAL FLOWMETER

CROSS-REFERENCE TO RELATED APPLICATIONS

The present application is related to and claims the priority benefit of German Patent Application No. 10 2017 112 622.8, filed on Jun. 8, 2017 and International Patent Application No. PCT/EP2018/061862 filed on May 8, 2018, the entire contents of which are incorporated herein by reference.

TECHNICAL FIELD

The present invention relates to a thermal flowmeter according to the preamble of claim 1.

BACKGROUND

In the market, insertion devices or plug-in devices are usually equipped with a protective bracket. The protective bracket has the task of protecting the delicate temperature sensors against damage. For example, the sensor could be damaged if improperly added to the pipeline. Furthermore, the protective bracket may also have the task of conditioning the flow. The measurement accuracy can thus be improved. With plug-in devices, the sensor tube is secured by a screw connection. When there is overpressure during the process, the screw connection must not be released. If the screw connection is nevertheless mistakenly released, the sensor shoots out of the pipeline without advance warning. For safety, most sensors have a diameter enlargement, for example a stop, at the sensor end (on the sensor side). This diameter enlargement has the effect that the sensor cannot escape from the screw connection and thus does not completely shoot out of the pipeline. This diameter enlargement is usually achieved by a welded piece or by deformation of a tube. The diameter enlargement has the disadvantage that an additional part has to be welded on or the tube has to be deformed, which makes construction more expensive. It is also disadvantageous that the screw connection can now only be pushed onto the sensor tube from one end (on the electronics side). As a result, a releasable connection must be provided where the electronics are attached. If, on the other hand, a welded connection is to be provided, the internal cables or data lines and/or power lines must be protected from heat in an elaborate manner.

SUMMARY

The aim of the invention is therefore to provide a thermal flowmeter in which the sensor elements are sufficiently protected against mechanical damage and which can be produced in a simpler and less complicated manner.

The present invention achieves this aim by a thermal flowmeter having the features of claim 1.

A thermal flowmeter according to the invention comprises at least one measurement sensor with a sensor arrangement for determining a measured value for determining the flow rate of a medium; with a measurement transducer for determining the flow rate by means of the determined measured value; a tubular connecting element for connecting the sensor arrangement to the measurement transducer, wherein a protective sleeve is provided which is mechanically connected to the tubular connecting element, and wherein the protective sleeve has a sleeve jacket with at least two openings. One of these openings is an inflow opening through which the medium can be delivered to the sensor arrangement, and the other opening is an outflow opening through which the medium can flow out of the sensor arrangement.

The mechanical connection between the protective sleeve and the tubular connecting element can be designed in this case as a positive engagement which completely encloses the connecting element, or it can be a partially positive engagement, for example circumferentially distributed projections, for example in the form of detents, which engage in an annular groove.

The connection can take place exclusively mechanically or can additionally be reinforced by a welded connection, preferably by weld points.

Advantageous embodiments of the invention are the subject matter of the subclaims.

At least in the region of the positive engagement, i.e., a connection in which the sensor sleeve and the connecting element are brought into engagement, the sensor sleeve advantageously has an inner diameter that is smaller than the outer diameter of the tubular connecting element.

The protective sleeve can advantageously have a sectional circumferential ring segment, preferably at the end. The ring segment allows the one-piece monolithic design of the protective sleeve.

The protective sleeve and the tubular connecting element are preferably two components connected, in particular directly, to one another.

The mechanical connection between the protective sleeve and the tubular connecting element advantageously serves to axially fix the protective sleeve relatively to the connecting element. "Axial fixing" is to be understood as fixing the displaceability of the protective sleeve along the longitudinal axis of the connecting element. Fixing can take place in a region in which there is no bonded connection but only a positive engagement. An additional bonded connection between the protective sleeve and the connecting element can take place elsewhere or in a region in which the protective sleeve is connected to the tubular connecting element by mutual engagement.

A first one of the components may have a depression or recess, and a second one of the components may have a projection, the releasable connection of the two components occurs when the projection engages in the depression. It may be, for example, a bayonet or a latching connection.

The tubular connecting element of the thermal flowmeter can have an annular connecting element with an inner diameter for fastening, in particular media-tight fastening, of the thermal flowmeter to the tube wall of a tube, for example a measuring tube, wherein the outer diameter of the protective sleeve is greater than the inner diameter of the connecting element.

In a released state, the annular connecting element may allow an axial displaceability of the tubular connecting element relative to the tube along a longitudinal axis A of the tubular connecting element.

The protective sleeve or the sleeve wall of the protective sleeve may have a chamfer in an end region so that the outer diameter of the protective sleeve increases over the course of the longitudinal axis toward the protective sleeve center. This permits the connecting element to run up to the sleeve wall when the thermal flowmeter shoots out.

Starting from the circumferential ring segment, the protective sleeve can have at least two branches, each of the branches having a longitudinal axis. The longitudinal axes can extend in parallel to the longitudinal axis A of the protective sleeve, each of the branches having a shell-shaped end section, the end sections being separated from one another by at least one, in particular two, slots extending in parallel to the longitudinal axis A. Thus, a spreading of the branches can take place so that the protective sleeve can be pulled onto the measurement sensor during installation of the protective sleeve.

BRIEF DESCRIPTION OF THE DRAWINGS

The invention is explained in more detail below with reference to several exemplary embodiments and with the aid of the accompanying figures. In this case, the figures also contain a plurality of features which, taken individually, can be combined in an obvious manner with other exemplary embodiments not shown. The exemplary embodiments in their entirety are in no way to be understood as limiting the scope of protection of the present invention.

In the Figures.

DETAILED DESCRIPTION

Figure 1:
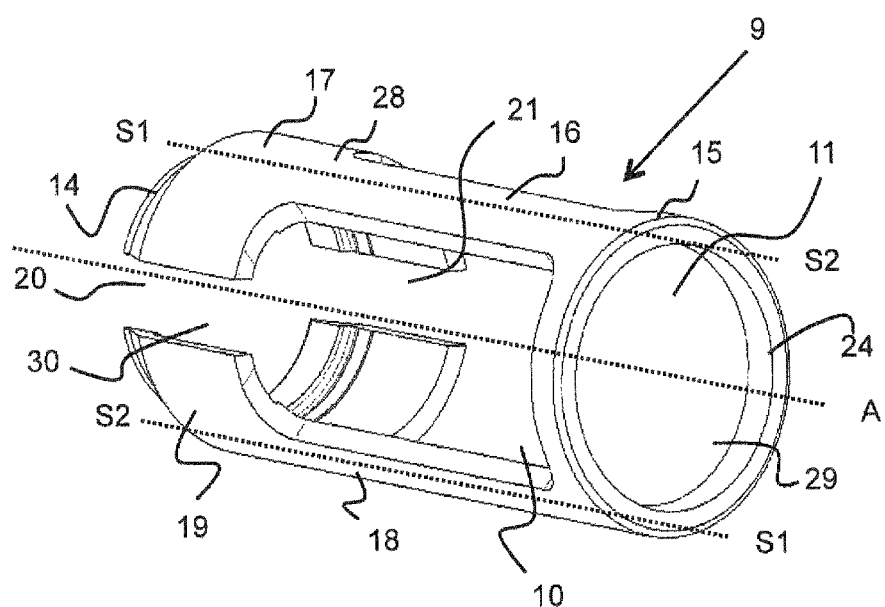
FIG. 1 shows a perspective view of a protective sleeve of a thermal flowmeter.
Figure 2:
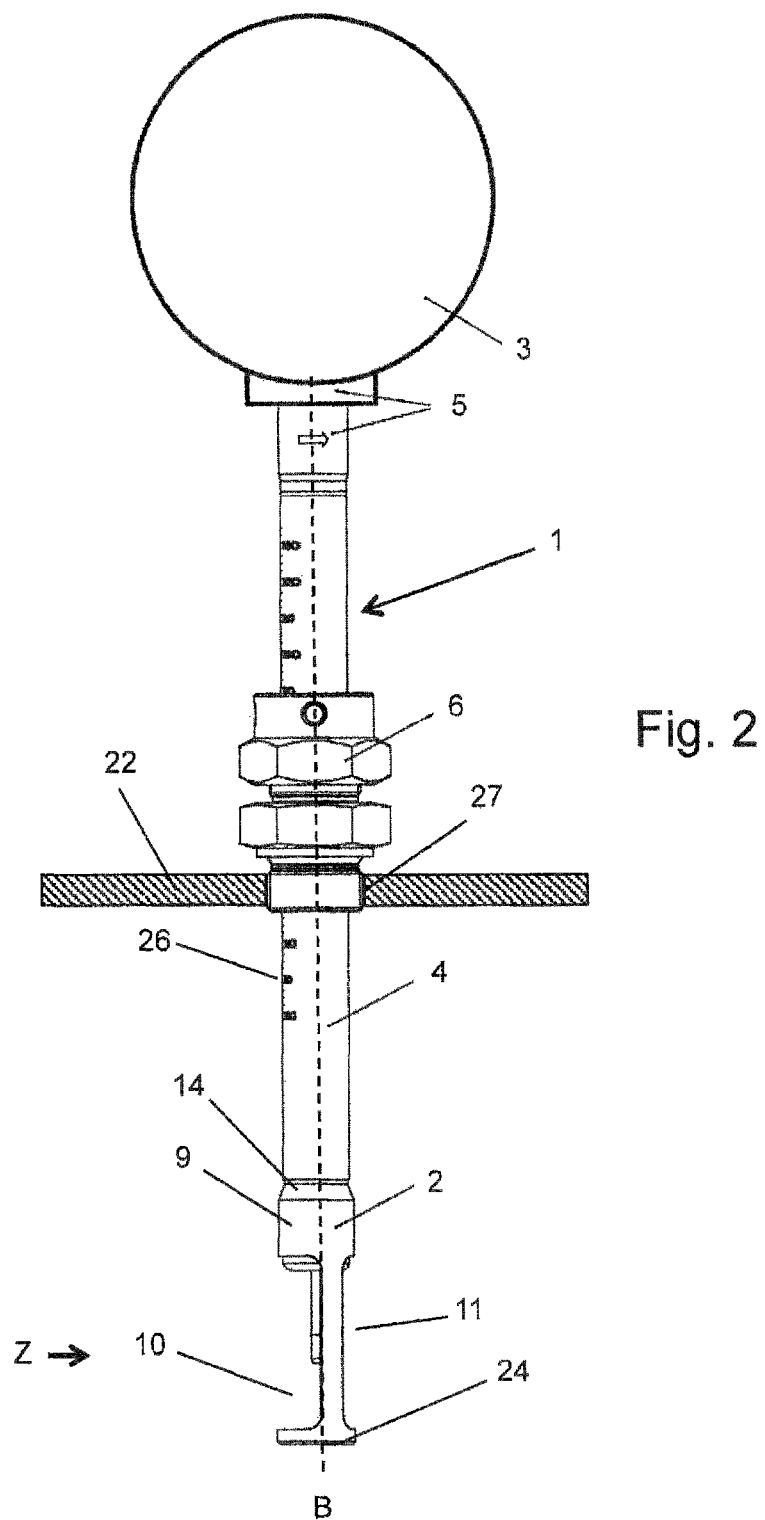
FIG. 2 shows a side view of the thermal flowmeter according to the present disclosure with the protective sleeve of FIG. 1.
Figure 3:
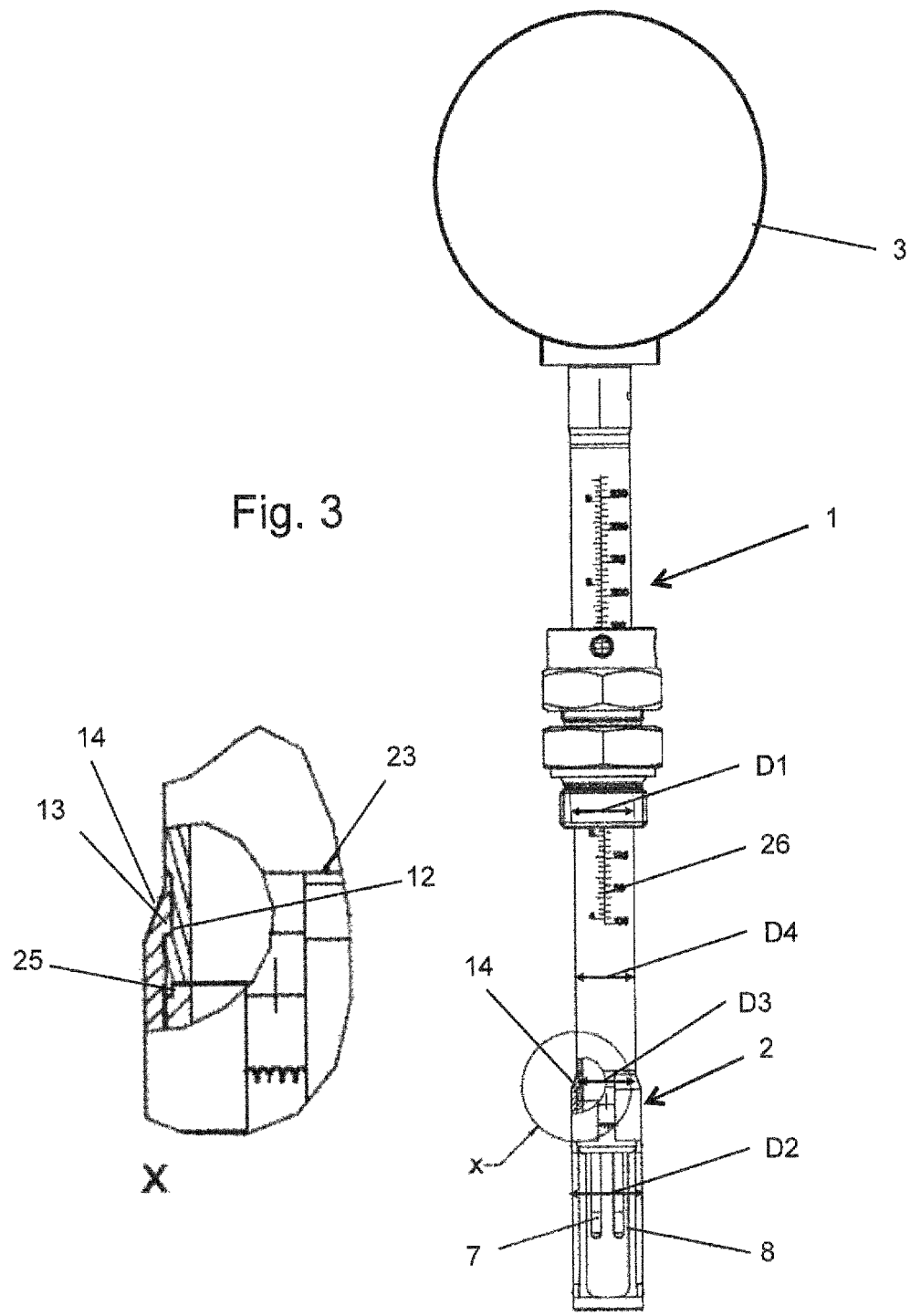
FIG. 3 shows a sectional detailed view of the thermal flowmeter of FIG. 1 with a partial cutout X in a connecting region.

FIGS. 1 to 3 show a version of an embodiment of a thermal flowmeter 1 with which a flow rate, in particular a mass flow rate, of a medium flowing through a tube can be determined.

The thermal flowmeter has a measurement sensor 2 for determining a measured value by measuring the medium, and a measurement transducer 3 for converting the measured value into a flow rate or an indication of a flow rate or of a flow velocity. The thermal flowmeter 1 has a longitudinal axis. The measurement sensor 2 and the measurement transducer 3 are connected, for example welded, to one another by a tubular connecting element 4. The connecting element can serve to thermally decouple the measurement transducer 3 from the measurement sensor 2, and can also protect power and data lines (not shown) between the measurement sensor 2 and the measurement transducer 3.

The measurement sensor 2 has at least one first and one second sensor element 7, 8. Each of the two sensor elements 7, 8 comprises a metallic pin sleeve and a temperature sensor, in particular a resistance thermometer, arranged therein. At least one, preferably both temperature sensors can have a heating device so that the temperature sensors can be heated.

The two sensor elements 7, 8 can preferably be designed as resistance thermometers designed as identically as possible, and can be arranged in the pin-shaped metal sleeves, so-called stingers. Thus, the temperature sensors are in thermal contact with the medium flowing through a measuring tube or through the pipeline. For industrial application, the sensor elements project into the medium-carrying tube. The measurement sensor can thus be mounted directly in a pipeline or be mounted with a measuring tube which is part of the flowmeter. At least one of the two sensor elements 7 or 8 is a so-called active sensor element, in which the resistance thermometer is heated by means of a heating unit assigned to the sensor element. Either an additional resistance heater is provided as the heating unit, or the resistance thermometer itself is a resistance element, e.g. an RTD (resistance temperature device) sensor, which is heated by conversion of electrical power, e.g. by a corresponding variation of the measurement current. The second sensor element 7 or 8 is a so-called passive sensor element: It measures the temperature of the medium.

A heatable resistance thermometer is usually heated in a thermal flowmeter in such a way that a fixed temperature difference is established between the two resistance thermometers of the sensor elements. Alternatively, it has also become known to supply a constant heating power via a control unit.

If no flow occurs in the measuring tube, a temporally constant heat quantity is required to maintain the predetermined temperature difference. If, in contrast, the medium to be measured is in motion, the cooling of the heated resistance thermometer is substantially dependent on the mass flow rate of the medium flowing past. Since the medium is colder than the heated resistance thermometer, heat is transported away from the heated resistance thermometer by the medium flowing past. Thus, in order to maintain the fixed temperature difference between the two resistance thermometers in the case of a flowing medium, increased heating power is required for the heated resistance thermometer. The increased heating power is a measure for the mass flow rate or mass flow of the medium through the pipeline.

On the other hand, if a constant heating power is supplied, the temperature difference between the two resistance thermometers is reduced due to the flow of the medium. The respective temperature difference is then a measure of the mass flow rate of the medium through the pipeline or through the measuring tube.

There is thus a functional relationship between the heating energy necessary for heating the resistance thermometer of the sensor element 7 or 8 and the mass flow rate through a pipeline or through a measuring tube. The dependence of the heat transfer coefficient on the mass flow rate of the medium through the measuring tube or through the pipeline is used in thermal flowmeters, in particular for determining the mass flow rate. Devices based on this principle are offered and sold by the applicant under the names 't-switch,' 't-trend' or 't-mass.'

The tubular connecting element 4 of FIGS. 2 and 3 has a scale 26 for determining the insertion depth of the thermal flowmeter 1 in a tube 22. The tubular connecting element 4 has a longitudinal axis B which lies on the longitudinal axis of the thermal flowmeter 1. Arranged on the tubular connecting element 4 is an annular connecting element 6, preferably a screw connection, for arranging the connecting element 4 on a tube 22, for example a measuring tube of the thermal flowmeter. The tubular connecting element 4 can in this case have a released state in which it is displaceably mounted relative to a tube 22, and a fixed state in which it is fixedly connected to the tube 22. It is possible to change from the released to the fixed state by means of a force and/or form fit or by means of a screw, for example a grub screw, arranged radially in the connecting element 6. The tubular connecting element 4 is connected to the measurement transducer 3 at a connection piece 5. The connection piece 5 is cylindrical and has a larger diameter than the tubular connecting element 4.

The sensor elements 7, 8 are surrounded by a protective sleeve 9 for protection against damage. The protective sleeve 9 has a longitudinal axis A and a sleeve jacket 28 and at least one, preferably two, end openings 29, 30.

The sleeve jacket 28 also has two openings 10, 11. An end opening 30 in the protective sleeve 9 serves to receive an end region of the tubular connecting element 6. The openings 10, 11 in the sleeve casing 28 serve to guide the medium through the protective sleeve 9 and along the two sensor elements 7, 8. The sleeve casing 28 has a circumferential, closed ring segment 15 as a projection and at least two branches 16, 18 adjacent to the openings 10, 11. The ring segment 15 is preferably a medium-side end segment of the protective sleeve 9. Each of the branches 16 or 18 may optionally have one or more terminal shell-shaped end sections 17. The shell-shaped end sections 17, 19 have a substantially circular arc shape on a cross-sectional plane perpendicular to the longitudinal axis A of the protective sleeve 9.

Of course, one branch 16 or 18 can also have plurality of these shell-shaped end sections 17, or one end section 17 or 19 can have a plurality of branches. Each branch 16, 18 has a longitudinal axis S1 or S2 which extends in parallel to the longitudinal axis A of the protective sleeve 9. In the assembled state, the longitudinal axis A of the protective sleeve 9 lies on the longitudinal axis B of the thermal flowmeter 1. The shell-shaped end sections 17, 19 encompass the tubular connecting element 4. In order to prevent axial displaceability along the tubular connecting element 6, the protective sleeve 9 has a projection 13, in particular in the region of the shell-shaped end sections 17, 19 or on the branches 16, 18, which projection projects from an inner side of the protective sleeve 9 facing the tubular connecting element 4. The projection 13 projects radially into the lumen of the protective sleeve 9.

The projection 13 can be designed to be punctiform or particularly preferably in the form of an arcuate ring segment. In order to prevent the cross-section of the protective sleeve 9 from excessively widening in relation to the tubular connecting element 4, the connecting element 4 has one or more, preferably circumferential depressions 25 at least for partially or completely receiving the projection 13. The depression 25 can be designed as an annular groove which can be manufactured relatively easily and extends circumferentially in a wall of the tubular connecting element 4. For variably positioning the protective sleeve 9 along the longitudinal axis B of the thermal flowmeter 1, a plurality of depressions 25, 12, in particular annular grooves, can also be arranged at a distance from one another in the wall of the connecting element 4.

The connection of the projection to the depression is a positive engagement and, if there is a malfunction or a restoring force of the branches 16, 18, can additionally also be a non-positive connection. The branches 16, 18 and the end sections 17, 19 can be movable toward one another in the radial direction to a limited extend without the presence of a bonded connection between the tubular element 4 and/or the protective sleeve 9 so that the branches 16, 19 can spread out during installation and the protective sleeve 9 can thus be placed onto the connecting element 4 and the measurement sensor 2 through the opening 30 and can optionally be subsequently fixed in a bonded manner, for example by welding and soldering.

Between the shell-shaped end sections 17, 19, at least one slot, preferably two slots 20, 21 are provided in the sleeve casing 28, which in FIGS. 1 to 3 have a course parallel to the longitudinal axis A of the protective sleeve 9. The protective sleeve 9 can then be fixed to the connecting element 4 in a firmly bonded manner by weld points 23 in addition to the positive engagement. This form of mechanical, in particular positively engaged, connection has the advantage, among other things, that the fixing of the protective sleeve 9 does not lead to a change in material and a heat input by welding in the vicinity of the sensor elements 7, 8, and a purely mechanical connection, or a mechanical connection optionally supported with a few weld points, is sufficient for fixing the protective sleeve 9 to the remaining thermal flowmeter 1. Furthermore, the installation can take place very quickly during the production process, which brings about advantages in the production speed. As a further possibility of mechanically fixing a protective sleeve 9 to a connecting element, a bayonet connection which likewise has a depression and a projection can be realized in the scope of a further exemplary embodiment of the present invention instead of the projection 13 and the annular groove 25. Furthermore, the mechanical connection can also be achieved by a screw connection, wherein a greater wall thickness of both the sensor sleeve and the tubular connecting element 4 is required.

The mechanical connection, shown in FIGS. 1 to 3, between the protective sleeve and the remaining thermal flowmeter can also be achieved by a mechanical reversal, so that a depression can be formed in the protective sleeve 9, and a radial projection can be formed on the tubular connecting element 4. The protective sleeve 9 can advantageously be monolithic or multi-part, for example by connecting two half shells. The half shells can be connected both in a bonded manner and purely mechanically, or as a combination of these two connection variants.

The protective sleeve or sensor sleeve 9 has an outer diameter D2, for example in the region of the shell-shaped end sections 17, 19, which outer diameter is greater than an inner diameter D1 of the annular connecting element 6. A sensor-side end region 14 of the protective sleeve 9 has a reduction in the outer diameter D2 of the sensor sleeve 9. This reduction takes place in the form of a so-called chamfer. This chamfered end region 14 allows the connecting element 6 to rise in the event of the measurement sensor 2 being pushed out or shot out in the radial direction to the tube 22 in which the thermal flowmeter 1 is fixed, in particular in a tube opening 27. The connection between the sensor sleeve 9 and the connecting element 4 can be effected in particular in a latching manner. The annular connecting element 6 can be designed as a process connecting adapter with a nut with an external thread, wherein the process connecting adapter is fixed to the tube 22 of a pipeline. The tube 22 can advantageously be a measuring tube associated with the thermal flowmeter 1, or it can be a conventional tube of a pipeline. The nut with the external thread may be coupled to the process connecting adapter, for example as a screw connection.

The openings 10, 11 in the sleeve jacket 28 serve for introducing and discharging the medium in the flow direction Z, and for conditioning the flow for flowing around the sensor elements 7, 9. The openings are preferably milled into the sleeve material of the sleeve jacket 28. The sleeve material can advantageously be manufactured from steel, in particular stainless steel, from plastic, in particular from PEEK, or from titanium. The depression 25 preferably designed as an annular groove can advantageously be between 0.3 to 1.5 mm. The inner diameter D1 of the connecting element advantageously amounts to at least 70% of the outer diameter of the sensor sleeve 9, preferably between 75% to 95% of the outer diameter D2 of the sensor sleeve 9. In addition, the inner diameter D1 of the connecting element 6 can be at least 0.2 mm larger than the outer diameter of the tubular connecting element 4 so as to permit easy displacement in the released state. The sensor sleeve 9, in particular the sleeve casing 28, also has an inner diameter D3 which is smaller than the outer diameter D4 of the tubular connecting element 4 and/or of the measurement sensor 2.

In order to produce the thermal flowmeter 1 according to the invention shown in FIG. 1, at least the measurement sensor 2, the connecting element 4 and the connection piece 5 can be connected to one another, for example by welding.

Then, in a second step, the annular connecting element 6 is pushed onto the connecting element 4 from a measurement sensor-side end of the thermal flowmeter 1.

In a third step, the protective sleeve 9 can be lastly be placed onto the measurement sensor 2, and the connecting element 4 and be brought into a positive engagement with the annular groove of the connecting element 4.

In addition, a bonded, punctiform welding of the protective sleeve 9 to the connecting element 4 can take place.

During assembly, the connecting element 6 is thus first pushed over the tubular connecting element 4 on the sensor side. Afterwards, the protective sleeve 9 is mounted. The protective sleeve 9 is fixedly clamped in the annular groove on the connecting element 4. The protective sleeve 9 can be fixed to the connecting element 4 by a plurality of weld points.

The protective sleeve 9 can be produced from a tube, for example by mechanical machining or by laser cutting. At one end, it is slotted so that it becomes flexible there. As a result, the protective sleeve 9 can be widened and pushed over the measurement sensor 2, where it then engages in the annular groove. This is substantially a snap connection. The high forces which occur when the thermal flowmeter 1 shoots out and which strike the protective sleeve 9 cause the protective sleeve 9 to jam there.

Alternatively, the protective sleeve 9 can also be designed in several parts so that it is possible for the protective sleeve 9 to be completely slotted and to be disassembled into two parts, wherein these parts can be placed over the measurement transducer and can be connected to one another by a clamp. In this variant, the protective sleeve 9 is also subsequently fixed by means of weld points. The protective sleeve 9 of the thermal flowmeter 1 thus serves to protect the sensor elements of this device.

It is the end piece of the tubular connecting element which projects into the medium flowing through and partially envelops the measurement sensor, in particular the sensor elements 7, 8. In addition, a fixing of the protective sleeve 9 in the axial direction is achieved by the preceding positive engagement.

LIST OF REFERENCE SIGNS

1 Thermal flowmeter
2 Measurement sensor
3 Measurement transducer
4 Tubular connecting element
5 Connection piece
6 Annular connecting element
7 First sensor element
8 Second sensor element
9 Protective sleeve
10 First opening
11 Second opening
12 Depression
13 Projection
14 Sensor-side end region
15 Ring segment
16 First branch
17 First shell-shaped end section
18 Second branch
19 Second shell-shaped end section
20 First slot
21 Second slot
22 Tube, for example measuring tube
23 Weld point
24 Medium-side end region
25 Depression
26 Scale
27 Tube opening
28 Sleeve jacket
29 End opening
30 End opening
A Longitudinal axis of the protective sleeve
B Longitudinal axis of the tubular connecting element
Z Flow direction of the medium
S1 Longitudinal axis of the branch
S2 Longitudinal axis of the branch

The invention claimed is:

1. A thermal flow meter comprising at least one measurement sensor having at least one sensor element for determining a measured value for determining the flow rate of a medium; a measurement transducer for determining the flow rate using the measured value determined; and a tubular connecting element for connecting the at least one measurement sensor to the measurement transducer; w herein a protective sleeve is provided which is mechanically connected to the tubular connecting element, w herein the protective sleeve has a sleeve jacket having at least two openings, an inflow opening through which the medium is delivered to the measurement sensor, and an outflow opening through which the medium flows out of the measurement sensor, w herein the connection between the protective sleeve and the tubular connecting element is a connection which is positively engaged; w herein the protective sleeve has a sectionally circumferential ring segment; and wherein the protective sleeve has at least two branches starting from the circumferential ring segment w herein each of the branches has a longitudinal axis extending in parallel to a longitudinal axis of the protective sleeve, wherein each of the branches has a shell-shaped end section, wherein the shell-shaped end sections are separated from one another by slots extending in parallel to the longitudinal axis.

2. The thermal flowmeter of claim 1, wherein, in a region of the positive engagement, the protective sleeve has an inner diameter that is smaller than an outer diameter of the tubular connecting element.

3. The thermal flowmeter of claim 1, wherein the protective sleeve and the tubular connecting element are two components which are mechanically connected to one another.

4. The thermal flowmeter of claim 3, wherein a first one of the components has a depression or recess and that a second one of the components has a projection, wherein the connection of the two components takes place by engagement of the projection in the depression such that an axial fixing of the protective sleeve takes place along a longitudinal axis of the tubular connecting element.

5. The thermal flowmeter of claim 1, wherein the tubular connecting element of the thermal flowmeter has an annular connecting element for fastening the thermal flowmeter to a tube wall of a tube, wherein an outer diameter of the protective sleeve is greater than an inner diameter of the tubular connecting element.

6. The thermal flowmeter of claim 5, wherein the annular connecting element in a released state allows an axial displaceability of the tubular connecting element relative to the tube along a longitudinal axis of the tubular connecting element.

7. The thermal flowmeter of claim 1, wherein the protective sleeve is chamfered in an end region.

8. The thermal flowmeter of claim 1, wherein the protective sleeve is formed from metal or plastic.

* * * * *